US010038924B2

United States Patent
Ryu et al.

(10) Patent No.: US 10,038,924 B2
(45) Date of Patent: *Jul. 31, 2018

(54) METHOD AND APPARATUS FOR TRANSMITTING AND RECEIVING ADDITIONAL INFORMATION IN A BROADCAST COMMUNICATION SYSTEM

(71) Applicant: Samsung Electronics Co., Ltd., Suwon-si, Gyeonggi-do (KR)

(72) Inventors: Young-Sun Ryu, Seongnam-si (KR); Ji-Eun Keum, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,865

(22) Filed: Jun. 14, 2017

(65) Prior Publication Data

US 2017/0289584 A1 Oct. 5, 2017

Related U.S. Application Data

(63) Continuation of application No. 14/257,352, filed on Apr. 21, 2014, now Pat. No. 9,712,855.

(30) Foreign Application Priority Data

Apr. 19, 2013 (KR) ........................ 10-2013-0043835

(51) Int. Cl.
| | |
|---|---|
| H04N 7/173 | (2011.01) |
| H04N 21/235 | (2011.01) |
| H04N 21/858 | (2011.01) |
| H04N 21/462 | (2011.01) |
| H04N 21/61 | (2011.01) |
| H04N 21/434 | (2011.01) |
| H04N 21/435 | (2011.01) |
| H04N 21/81 | (2011.01) |
| H04N 21/41 | (2011.01) |
| H04N 21/8545 | (2011.01) |

(52) U.S. Cl.
CPC ....... *H04N 21/235* (2013.01); *H04N 21/4122* (2013.01); *H04N 21/435* (2013.01);
(Continued)

(58) Field of Classification Search
None
See application file for complete search history.

(56) References Cited

U.S. PATENT DOCUMENTS

| | | |
|---|---|---|
| 7,320,134 B1 | 1/2008 | Tomsen et al. |
| 7,716,682 B2 | 5/2010 | Maes |
| 8,095,887 B2 | 1/2012 | Lee et al. |
| 2002/0162120 A1 | 10/2002 | Mitchell |
| 2003/0107677 A1 | 6/2003 | Lu et al. |
| 2006/0184965 A1 | 8/2006 | Lee et al. |
| 2006/0212902 A1 | 9/2006 | Seo et al. |

(Continued)

FOREIGN PATENT DOCUMENTS

| | | |
|---|---|---|
| EP | 2 343 881 A2 | 7/2011 |
| JP | 2012-235527 A | 11/2012 |

(Continued)

OTHER PUBLICATIONS

Digital Video Broadcasting (DVB); Signalling and Carriage of Interactive Applications and Services in Hybrid Broadcast/Broadband Environments, ETSI TS 102 809, Jan. 7, 2010, pp. 1-98, V1.1.1, XP055120418.

*Primary Examiner* — William J Kim
(74) *Attorney, Agent, or Firm* — Jefferson IP Law, LLP

(57) ABSTRACT

A method for receiving additional information from a device in a broadcast communication system is provided. The method includes receiving broadcast information provided from a broadcast service provider over a broadcast channel, extracting application information from the broadcast information, acquiring location information for the additional information associated with a broadcast content from the application information, and transmitting the location information for the additional information to a peer device for displaying the additional information.

20 Claims, 7 Drawing Sheets

(52) U.S. Cl.
    CPC ..... *H04N 21/4345* (2013.01); *H04N 21/4622*
            (2013.01); *H04N 21/6125* (2013.01); *H04N*
            *21/8133* (2013.01); *H04N 21/8545* (2013.01);
                           *H04N 21/8586* (2013.01)

(56)             References Cited

U.S. PATENT DOCUMENTS

| | | |
|---|---|---|
| 2006/0277575 A1 | 12/2006 | Lee et al. |
| 2006/0282773 A1 | 12/2006 | Kim |
| 2007/0283402 A1 | 12/2007 | Yu |
| 2008/0089551 A1 | 4/2008 | Heather et al. |
| 2008/0127289 A1 | 5/2008 | Julia et al. |
| 2009/0322714 A1 | 12/2009 | Lee et al. |
| 2010/0107181 A1 | 4/2010 | Kim et al. |
| 2011/0202951 A1 | 8/2011 | Ann et al. |
| 2012/0016928 A1 | 1/2012 | Park et al. |
| 2012/0254928 A1 | 10/2012 | Oztaskent et al. |
| 2013/0007827 A1 | 1/2013 | Adam et al. |
| 2013/0289983 A1 | 10/2013 | Park et al. |
| 2014/0040963 A1 | 2/2014 | Keum et al. |
| 2014/0130087 A1 | 5/2014 | Cho et al. |

FOREIGN PATENT DOCUMENTS

| | | |
|---|---|---|
| JP | 2013017172 A | 1/2013 |
| JP | 2013055280 A | 3/2013 |
| JP | 2013066159 A | 4/2013 |
| KR | 10-2011-0093571 A | 8/2011 |
| KR | 10-2013-0012306 A | 2/2013 |
| KR | 10-2013-0015061 A | 2/2013 |
| WO | 2014/021627 A1 | 2/2014 |

METHOD AND APPARATUS FOR TRANSMITTING AND RECEIVING ADDITIONAL INFORMATION IN A BROADCAST COMMUNICATION SYSTEM

CROSS-REFERENCE TO RELATED APPLICATION(S)

This application is a continuation application of prior application Ser. No. 14/257,352, filed on Apr. 21, 2014, which claimed the benefit under 35 U.S.C § 119(a) of a Korean patent application filed on Apr. 19, 2013 in the Korean Intellectual Property Office and assigned Serial number 10-2013-0043835, the entire disclosure of each of which is hereby incorporated by reference.

TECHNICAL FIELD

The present disclosure relates to a method and an apparatus for transmitting and receiving additional information in a broadcast communication system. More particularly, the present disclosure relates to a method for transmitting and receiving a multimedia service to a user by using a port device in a broadcast communication system.

BACKGROUND

Recently, a broadcast communication system has evolved to provide a Hybrid Broadcast Broadband TeleVision (HBBTV) service that allows a TeleVision (TV) to support both a broadcast channel and an Internet Protocol (IP)-based broadband channel. The HBBTV service is one of digital broadcast system standards proposed in Europe.

In a broadcast communication system that provides the HBBTV service, a smart TV, and the like cap of providing various multimedia services may be used. In the smart TV, and the like, various applications may be used to provide multimedia-based broadcast services.

FIG. 1 illustrates a configuration of a broadcast communication system according to an embodiment of the related art.

Referring to FIG. 1, the broadcast communication system will be assumed as a system that provides the HBBTV service by way of example.

The broadcast communication system includes a broadcast service provider 110, a user device 104, and the Internet 11. As an example, the broadcast service provider 110 may be a broadcasting station, and the like, and the user device 104 may be a smart TV, and the like. The broadcast service provider 110 provides a broadcast service to the user device 104 over a c broadcast channel or a wireless broadcast channel. Although not illustrated in the drawing, the broadcast service provider 110 may include a broadcast server, and the like, and the broadcast server may provide additional information associated with the broadcast service to the user device 104 over the Internet 11 to which the broadcast server is connected via a broadband channel.

In a wireless communication system, a mobile terminal has evolved into a smart phone to which a high speed packet data service is provided over a broadband channel, and thus users can be provided with useful functions through applications installed in a smart phone. Since users may use various types of port devices, such as a tablet, a laptop computer, a notebook computer, a smart phone, and the like, to be provided with a multimedia service, the multimedia services provided in the port devices are also proposed in various manners.

In the broadcast communication system of FIG. 1, if a user uses the user device 104 and a port device together, the user may be provided with more various types of broadcast services, and the user's convenience may also be enhanced. Therefore, there is a need for a way to provide a multimedia service to a user by using a port device in a broadcast communication system as in FIG. 1.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting and receiving additional information in a broadcast communication system.

Another aspect of the present disclosure is to provide a method and an apparatus for transmitting and receiving additional information to a port device of a user in a broadcast communication system.

In accordance with an aspect of the present disclosure, a method for receiving additional information from a device in a broadcast communication system is provided. The method includes receiving broadcast information provided from a broadcast service provider over a broadcast channel, extracting application information from the broadcast information, acquiring location information for the additional information associated with a broadcast content from the application information, and transmitting the location information for the additional information to a peer device for displaying the additional information.

In accordance with another aspect of the present disclosure, a method for receiving additional information from a device in a broadcast communication system is provided. The method includes receiving location information for the additional information associated with a broadcast content from a peer device, requesting a server for the additional information over a broadband channel, based on the location information, and receiving the additional information from the server.

In accordance with another aspect of the present disclosure, a method for receiving additional information from a device in a broadcast communication system is provided. The method includes receiving temporary location information for the additional information associated with a broadcast content from a peer device, requesting the peer device for the additional information, based on the temporary location information, and receiving the additional information from the peer device.

In accordance with another aspect of the present disclosure, a device for receiving additional information in a broadcast communication system is provided. The device includes an interface configured to receive broadcast information provided from a broadcast service provider over a broadcast channel, and a manager configured to extract application information from the broadcast information, to acquire location information for the additional information associated with a broadcast content from the application information, and to transmit the location information for the additional information to a peer device for displaying the additional information.

In accordance with another aspect of the present disclosure, a device for additional information in a broadcast communication system is provided. The device includes a receiver configured to receive location information for the additional information associated with a broadcast content from a peer device, and to receive the additional information from a server and a transmitter configured to request the server for the additional information over a broadband channel, based on the location information.

In accordance with another aspect of the present disclosure, a device for receiving additional information in a broadcast communication system is provided. The device includes a receiver configured to receive temporary location information for the additional information associated with a broadcast content from a peer device, and to receive the additional information from the peer device and a transmitter configured to request the peer device for the additional information, based on the temporary location information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
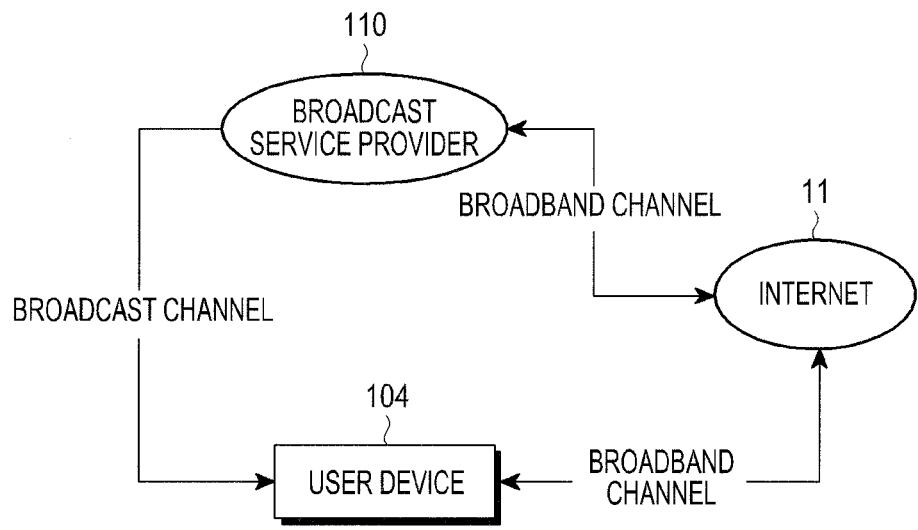
FIG. 1 illustrates a configuration of a broadcast communication system according to an embodiment of the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to en a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description of various embodiments of the present disclosure, a detailed description of known functions or configurations incorporated herein will be omitted when it is determined that the detailed description thereof may unnecessarily obscure the subject matter of the present disclosure.

The following description of various embodiments of the present disclosure will be directed to a Hybrid Broadcast Broadband TeleVision (HBBTV) system. However, it should be noted that the present disclosure may also be applied to various digital broadcast communication systems cap of using both a c or a wireless broadcast channel and a broadband channel, as well as the HBBTV system.

In the HBBTV system, a multimedia service may be considered, which allows at least two electronic devices, such as a smart TV and a port device to share contents with each other or to use contents by being linked with each other.

Further, the HBBTV standard defines a communication environment where broadcast information is received over a broadcast channel in a broadcast network, and a data signal is received over a broadband channel in an Internet Protocol (IP) network.

In a broadcast communication system, a user device, for example, a smart TV, receives a broadcast content from a broadcast service provider over a broadcast channel, and consumes the received broadcast content. In this scenario, the broadcast service provider transmits a data signal including additional information and the like associated with the broadcast content over a broadband channel. Further, broadcast information provided over the broadcast channel includes an Application Information T (AIT), and the AIT includes metadata by which an application associated with the broadcast content can be executed in the user device.

As an example, the user device receives a broadcast content from the broadcast service provider over the broadcast channel, and along with the broadcast content, also receives a network address for receiving additional information associated with the broadcast content. The network address may be, for example, Internet connection information, such as a Uniform Resource Locator (URL). Thereafter, the user device requests the broadcast service provider for the additional information associated with the broadcast content over a broadband channel by using the URL. Subsequently, the user device receives the additional information associated with the broadcast content from the broadcast service provider.

As another embodiment of the present disclosure, if there are at least two user devices, for example, if a smart TV and a user's port device, such as a smart phone are used together, the user may receive a broadcast content through the smart TV and receive additional information associated with the broadcast content through the user's port device.

Figure 2:
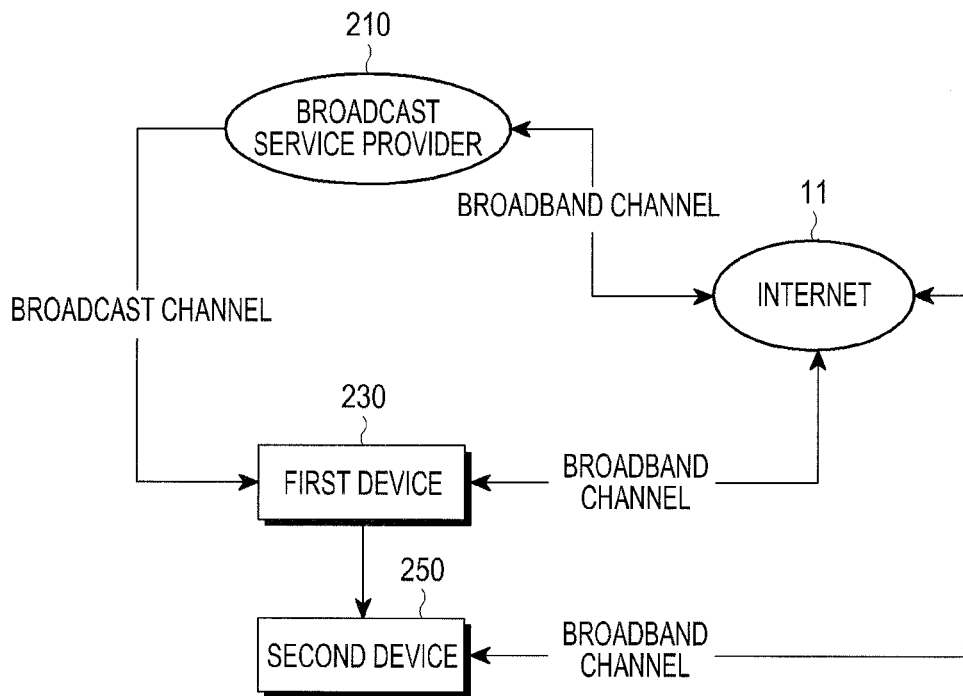
FIG. 2 illustrates a configuration of a broadcast communication system according to an embodiment of the present disclosure.

FIG. 2 illustrates a configuration of a broadcast communication system according to an embodiment of the present disclosure.

Referring to FIG. 2, the broadcast communication system will be assumed as a system that provides the HBBTV service by way of example.

The broadcast communication system includes a broadcast service provider 210, a first device 230, a second device 250, and the Internet 11. In the HBBTV communication environment where the first device 230, for example, a smart TV, is simultaneously connected to a broadcast channel and a broadband channel (e.g., an IP channel), the second device 250 equipped with a means for displaying additional information of a broadcast content may be linked with the first device 230 to receive and display the additional information.

For example, the first device 230 receives broadcast information and a broadcast content provided from the broadcast service provider 210 over a broadcast channel, and extracts an AIT from the broadcast information. In an embodiment of the present disclosure, the AIT includes a network address where additional information associated with the broadcast content can be received, that is, a URL for additional information. In addition, the first device 230 extracts the URL for additional information from the AIT, and conveys the extracted URL to the second device 250.

Thereafter, the first device 230 may display the received broadcast content as a main broadcast, and the second device 250 may receive the additional information associated with the broadcast content from the broadcast service provider 210 or an external server by using the URL for additional information and display the received additional information.

As another embodiment of the present disclosure, if the broadcast information provided from the broadcast service provider 210 over the broadcast channel includes the additional information, the first device 230 extracts the additional information, and conveys the extracted additional information to the second device 250. Thereafter, the second device 250 may display the additional information received from the first device 230.

Figure 3:
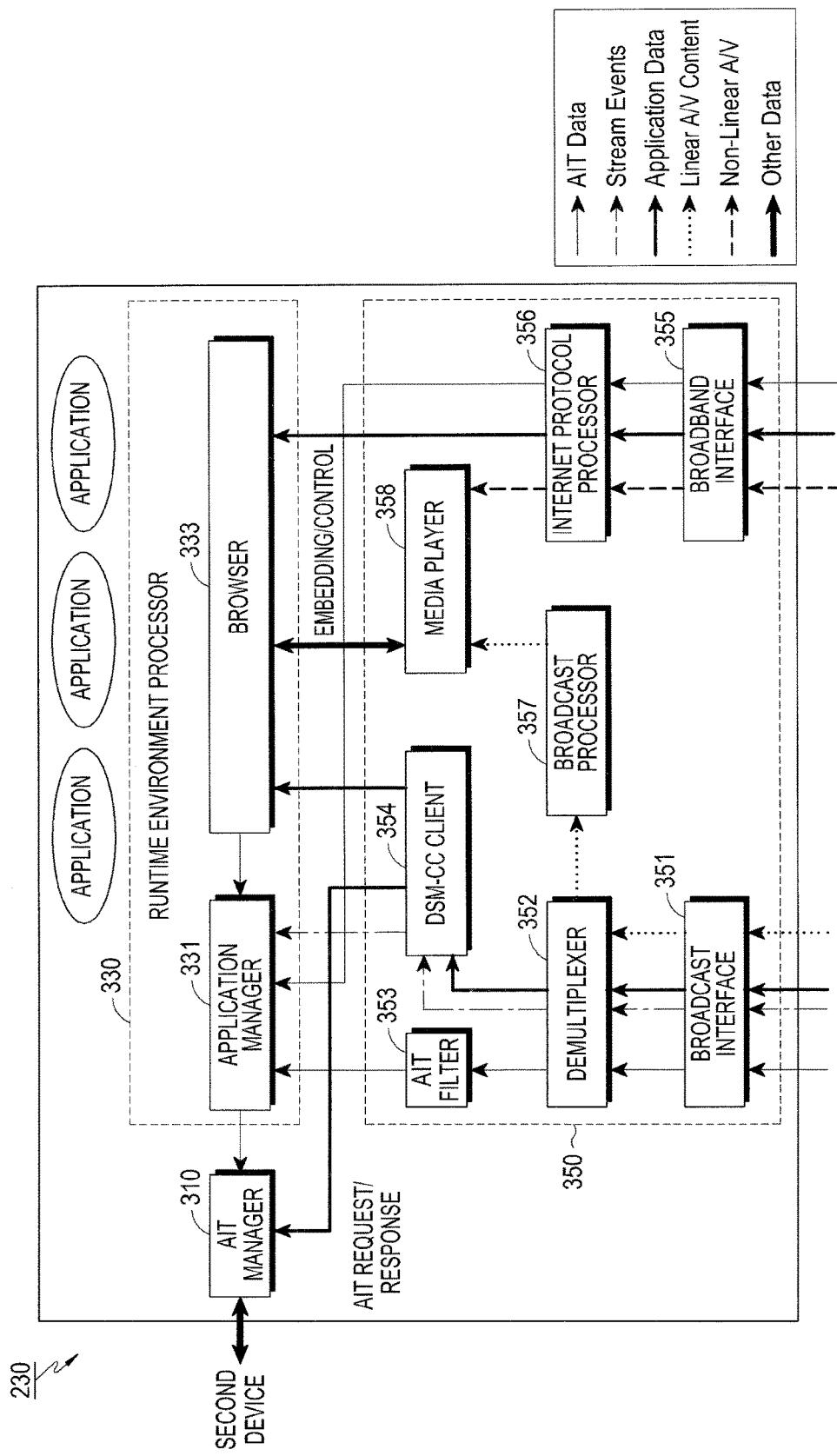
FIG. 3 is a block diagram illustrating an internal structure of a device in a broadcast communication system according to an embodiment of the present disclosure.

FIG. 3 is a block diagram illustrating an internal structure of a device in a broadcast communication system according to an embodiment of the present disclosure.

In the following description, the device will be assumed as the first device 230 of FIG. 2, and the first device 230 may be provided in a digital TV, such as a smart TV, to provide additional information. Further, the first device 230 may be provided in various types of digital devices cap of receiving a broadcast service, as well as the digital TV.

Referring to FIG. 3, the first device 230 includes an AIT manager 310, a runtime environment processor 330, and a broadcast and broadband processor 350. In addition, the runtime environment processor 330 includes an application manager 331 and a browser 333, and the broadcast and broadband processor 350 includes an AIT filter 353, a Digital Storage Media Command and Control (DSM-CC) client 354, a media player 358, a demultiplexer 352, a broadcast processor 357, an Internet protocol processor 356, a broadcast interface 351, and a broadband interface 355.

The first device 230 receives an AIT, a linear Audio/Video (A/V) content, an application, and stream event through the broadcast interface 351 for receiving a broadcast channel signal. The information received through the broadcast interface 351 is transferred to the AIT filter 353, the DSM-CC client 354, and the broadcast processor 357 through the demultiplexer 352. The DSM-CC client 354 recovers data streams conveyed through a DSM-CC object carousel, and provides the recovered data streams to the runtime environment processor 330.

According to an embodiment of the present disclosure, broadcast information received over a broadcast channel includes an AIT, and the AIT includes additional information associated with a broadcast content or a URL for additional information. The broadcast information is conveyed to the AIT filter 353 via the broadcast interface 351 and the demultiplexer 352. The AIT filter 353 extracts the AIT from the conveyed broadcast information, and conveys the extracted AIT to the application manager 331. The application manager 331 evaluates the extracted AIT and conveys the evaluated AIT to the AIT manager 310, and the AIT manager 310 extracts the additional information or the URL for additional information from the AIT and conveys the extracted additional information or URL to the second device 250.

In an embodiment of the present disclosure, the AIT manager 310 receives a request for additional information from the second device 250, and processes a response to the request. If the broadcast information includes the URL for additional information, the AIT manager 310 conveys the URL for additional information, included in the AIT, to the second device 250 in response to the request from the second device 250. However, if the broadcast information includes the actual data of the additional information, the AIT manager 310 stores the additional information in a temporary space on a memory (not shown) of the first device 230, generates a temporary URL for additional information, and conveys the generated temporary URL to the second device 250. In this scenario, the temporary URL for additional information means a network address indicating the location where the additional information is stored in the first device 230. If the second device 250 receives the temporary URL for additional information, it requests the first device 230 for the delivery of the additional information, and receives the additional information in response to the request.

Referring to FIG. 3, the runtime environment processor 330 refers to an abstract component that executes interactive applications. The application manager 331 evaluates AIT data provided through the AIT filter 353, and controls the life cycle of a corresponding interactive application. The browser 333 is responsible for executing an interactive application and responding to an operation of an application.

The broadcast processor 357 may process a broadcast content, for example, a linear A/V content, in a similar manner to that in a standard Digital Video Broadcasting (DVB) device. In addition, the broadcast processor 357 may include all DVB functions provided in the standard DVB device. However, in various embodiments of the present disclosure, the broadcast content is not limited to the DVB type, and may cover all broadcast contents of various types of broadcast systems that are provided along with additional information.

The broadcast processor 357 may provide additional information and functions, such as channel list, an Event Information Present/Following (EIT p/f) table, a tuning function, and the like, to the runtime environment processor 330. If a specific application modifies (scales and embeds) a linear A/V content through a user interface, the media player 358 is operated. The media player 358 includes functions to process an A/V content.

Referring to FIG. 3, the broadband processor 355 provides Internet connectivity to the first device 230. The first device 230 may request an application provider's server (not shown) for application data through the broadband processor 355, and may receive a non-linear A/V content, such as a Content on Demand (CoD). The Internet protocol processor 356 provides functions required for the first device 230 to process data received from the Internet. More specially, the Internet protocol processor 356 conveys application data to the runtime environment processor 330, and conveys non-linear A/V data to the media player 358.

Figure 4:
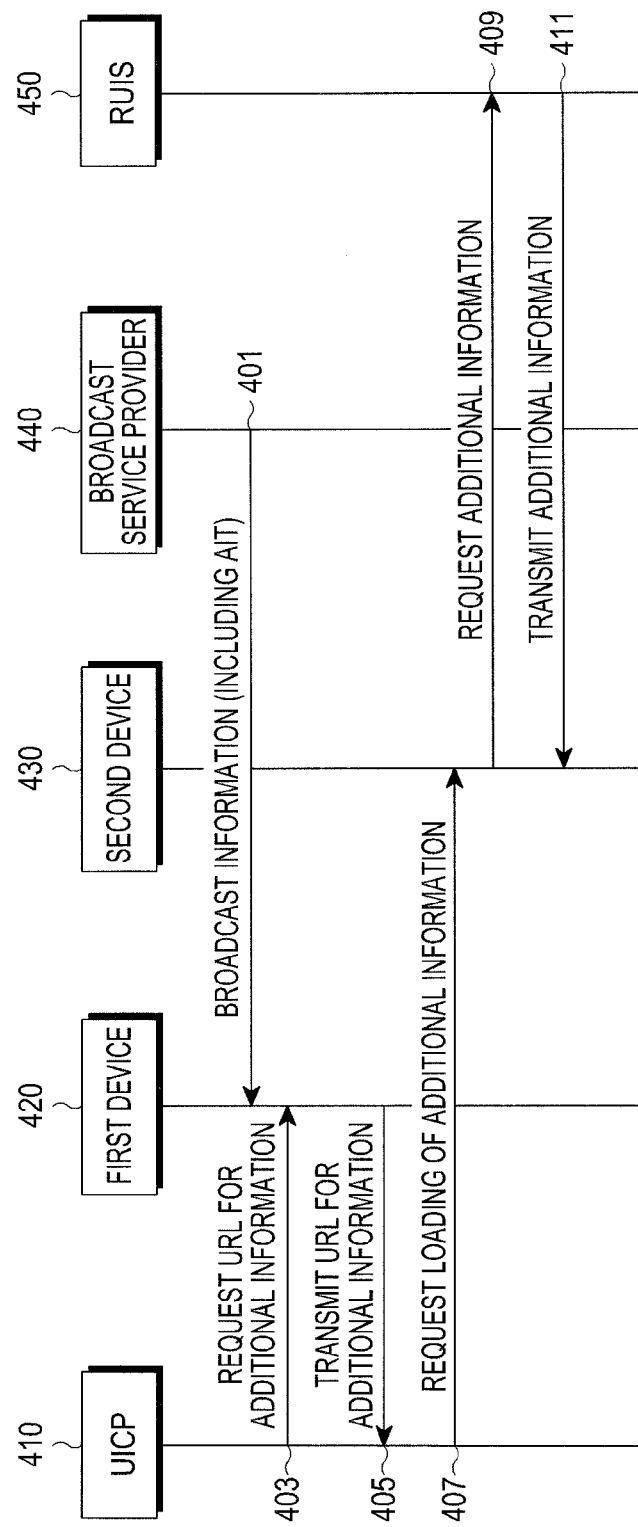
FIG. 4 is a signal flow diagram illustrating an operation of providing additional information to a device in a broadcast communication system according to an embodiment of the present disclosure.

FIG. 4 is a signal flow diagram illustrating an operation of providing additional information to a device in a broadcast communication system according to an embodiment of the present disclosure.

The embodiment of FIG. 4 shows an example in which a URL for additional information is included in broadcast information transmitted over a broadcast channel and the actual additional information is transmitted over a broadband channel. Further, the embodiment of FIG. 4 shows an example in which, for example, a Consumer Electronics Association (CEA)-2014-based Remote User Interface (RUI) technology is applied to a broadcast communication system of the present disclosure.

For the better understanding of the present disclosure, a brief description will now be given of the RUI technology. The RUI technology refers to a client-server architecture-based technology in which a Remote User Interface Client (RUIC) acquires a User Interface (UI) from a Remote User Interface Server (RUTS) so that a user may control the RUIS through the UI on the RUIC. The RUIS providing a UI for remote control includes a web server, and the RUIS transmits a web page required by the RUIC to the RUIC through the web server. Further, the RUIC may display the web page of a corresponding UI to the user through, for example, a Hyper Text Markup Language (HTML) browser. Further, the RUIS provides information on the RUIS to a User Interface Control Point (UICP), and the UICP is responsible for a connection between the RUIC and the RUIS. The UICP may be included in the RUIC or may separately exist.

In an embodiment of the present disclosure, the RUIC and the UICP may be implemented as a first and/or second device, and the RUIS may be implemented as a broadcast service provider or an external server of the broadcast service provider. In the embodiment of FIG. 4, for the convenience of description, the UICP is illustrated as a separate device from the first and second devices, and the RUIS is illustrated as a separate device from the broadcast service provider.

Referring to FIG. 4, in operation 401, a first device 420 receives broadcast information provided from a broadcast service provider 440 over a broadcast channel, and extracts an AIT including a URL for additional information from the broadcast information. In operation 403, at the request of a user through a second device 430, a UICP 410 requests the first device 420 for a URL for additional information.

Thereafter, in operation 405, an AIT manager (not shown) included in the first device 420 provides the URL for additional information, included in the AIT, to the UICP 410 in response to the request in operation 403. In operation 407, the UICP 410 conveys the URL for additional information to the second device 430 to request the second device 430 for the loading of the corresponding additional information. In operation 409, the second device 430 request an RUIS 450 for the corresponding additional information over a broadband channel by using the URL for additional information. Thereafter, in operation 411, the RUIS 450 transmits, for example, additional information composed of HTML to the second device 430, and the second device 430 displays the received additional information to the user.

Figure 5:
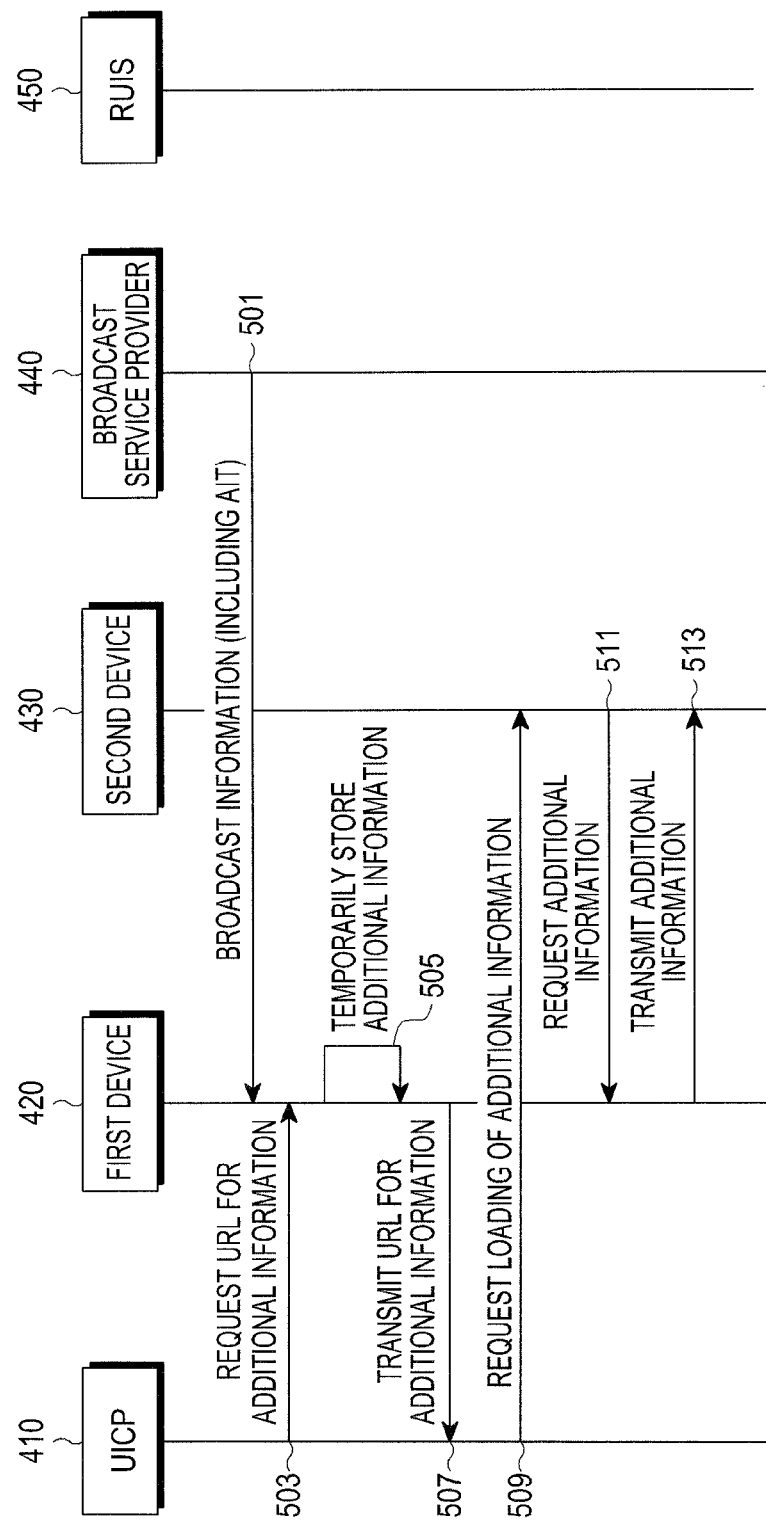
FIG. 5 is a signal flow diagram illustrating an operation of providing additional information to a device in a broadcast communication system according to an embodiment of the present disclosure.

FIG. 5 is a signal flow diagram illustrating an operation of providing additional information to a device in a broadcast communication system according to an embodiment of the present disclosure.

The embodiment of FIG. 5 shows an example in which the actual additional information is included in broadcast information transmitted over a broadcast channel, and a first device stores the additional information and then provides the additional information to a second device at the request of the second device. Further, the embodiment of FIG. 5 shows an example in which, for example, a CEA-2014-based RUI technology is applied to a broadcast communication system of the present disclosure.

Referring to FIG. 5, in operation 501, the first device 420 receives broadcast information provided from the broadcast service provider 440 over a broadcast channel, and extracts an AIT including the actual additional information from the broadcast information. In operation 503, at the request of a user through the second device 430, the UICP 410 requests the first device 420 for a URL for additional information. In operation 505, an AIT manager (not shown) included in the first device 420 checks the AIT. If the AIT includes data of additional information, the AIT manager extracts the corresponding additional information from the AIT, temporarily stores the extracted additional information, and generates a temporary URL for additional information that indicates the location where the additional information is temporarily stored.

Subsequently, in operation 507, the AIT manager included in the first device 420 provides the temporary URL for additional information to the UICP 410 in response to the request in operation 503. In operation 509, the UICP 410 conveys the temporary URL for additional information to the second device 430 to request the second device 430 for the loading of the corresponding additional information. Thereafter, in operation 511, the second device 430 requests the first device 420 for the additional information indicated by the temporary URL for additional information. In operation 513, the first device 420 transmits, for example, additional information composed of HTML, to the second device 430, and the second device 430 displays the received additional information to the user.

According to the above various embodiments of FIGS. 4 and 5, the UICP 410 requests the first device 420 for a URL for additional information. The operation of making a request for a URL may be supported by extending the schema that is applied to a Universal Plug and Play (UPnP) device. An example of the UPnP device extension schema defined in CEA-2014 is presented below in Table 1. In Table 1, the solid-line block represents the part required to make a request for a URL for additional information. For example, the UICP 410 makes a request for a URL for additional information through "retrieveCommandURL", and the AIT manager serves to process this request.

TABLE 1

```
<xs:element name="uiClientInfo">
    <xs:complexType>
        <xs:sequence>
            <xs:element name="connectCommandURL"
            type="xs:anyURI" minOccurs="1" maxOccurs="1" />
            <xs:element name="disconnectCommandURL"
            type="xs:anyURI" minOccurs="1" maxOccurs= "1" />
            <xs:element name="saveCommandURL"
            type="xs:anyURI" minOccurs="0" maxOccurs="1" />
            <xs:element name="restoreCommandURL"
            type="xs:anyURI" minOccurs="0" maxOccurs="1" />
            <xs:element name="retrieveCommandURL"
            type="xs:anyURI" minOccurs="0" maxOccurs="1" />
        </xs:sequence>
    </xs:complexType>
</xs:element>
```

Hereinafter, a procedure in which the UICP makes a request for a URL according to an embodiment of the present disclosure will be described.

If additional information is provided over a broadband channel as in the embodiment of FIG. 4, the UICP 410 uses the UPnP device extension schema of Table 1, and more particularly, requests the first device 420 for a URL for additional information by using the following GET command.

GET/retrieveCommandURL HTTP/1.1

If the URL request from the UICP 410 succeeds, then the AIT manager included in the first device 420 conveys the URL for additional information along with the following 510 code to the UICP 410. If the URL request from the UICP 410 fails, then the AIT manager included in the first device 420 conveys the following 520 code to the UICP 410.

```
<If URL request succeeds>
HTTP/1.1 510 Retrieve successful
AIT_URL: http://additional_information_url
<If URL request fails>
HTTP/1.1 520 Retrieve fail
```

If additional information is provided over a broadcast channel as in the embodiment of FIG. 5, the procedure in which the UICP 410 makes a request for a URL for additional information is the same as in the embodiment of the FIG. 4. However, in this scenario, the URL for additional information means a temporary URL temporarily generated in the first device 420, rather than an external URL used in a broadband channel. The second device 430 requests the first device 420 for the additional information by using the temporary URL, and the AIT manager included in the first device 420 processes the additional information request.

A response to the additional information request using the temporary URL is the same as in the following typical HTTP processing method.

```
<If request succeeds>
HTTP/1.1 200 OK
Content-Type: text/plain
Content-Length: xxx
<HTML>
<HEAD><TITLE> ... </TITLE>
....
<If request fails>
404 Not Found
```

As an example, response codes conveyed by the AIT manager included in the first device 420 are presented below in Table 2.

TABLE 2

| Response code | Meaning | Case where corresponding response code is used |
|---|---|---|
| 200 OK | This indicates that a request for additional information succeeds. This conveys an HTML content. | Embodiment of FIG. 5 |
| 404 Not Found | This indicates that a request for additional information fails. | Embodiment of FIG. 5 |
| 510 Retrieve successful | This indicates that a request for a URL for additional information succeeds. This conveys a URL for additional information. | Embodiments of FIGS. 4 and 5 |
| 520 Retrieve fail | This indicates that a request for a URL for additional information fails. | Embodiments of FIGS. 4 and 5 |

Figure 6:
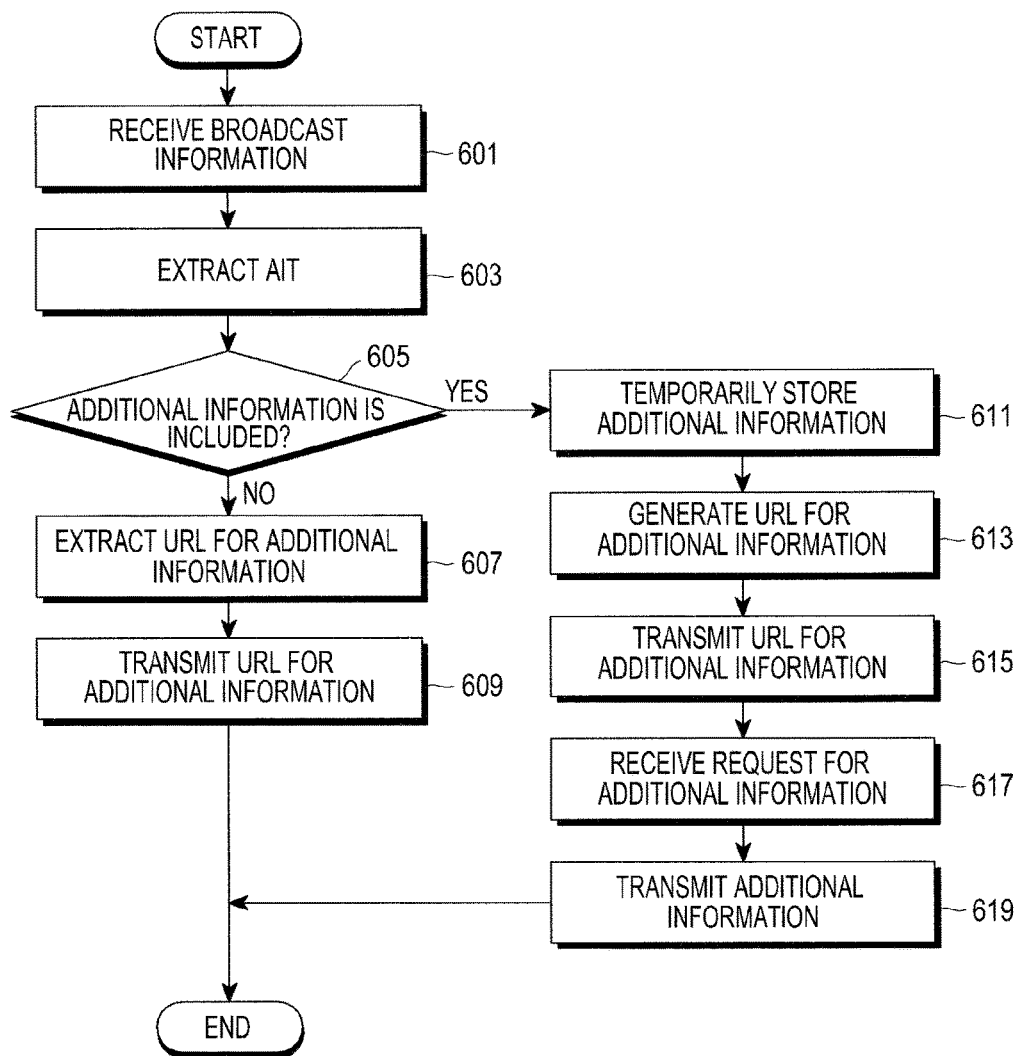
FIG. 6 is a flowchart illustrating an operation of providing additional information to a second device by a first device in a broadcast communication system according to an embodiment of the present disclosure

FIG. 6 is a flowchart illustrating an operation of providing additional information to a second device by a first device in a broadcast communication system according to an embodiment of the present disclosure.

Referring to FIG. 6, in operation 601, the first device receives a broadcast stream over a broadcast channel. The broadcast stream includes a broadcast content and broadcast information. The broadcast information includes an AIT, and the first device extracts the AIT from the broadcast information in operation 603. In operation 605, the first device determines if additional information is included in the extracted AIT. If, as a result of the determination in operation 605, additional information is not included in the AIT, then the first device extracts a URL for additional information from the AIT in operation 607. Further, in operation 609, the first device transmits the extracted URL for additional information to the second device.

On the other hand, if, as a result of the determination in operation 605, additional information is included in the AIT, then the first device proceeds to operation 611. In operation 611, the first device extracts additional information from the AIT, and temporarily stores the extracted additional information. In operation 613, the first device generates a temporary URL for additional information that indicates the location where the additional information is temporarily stored. In operation 615, the first device transmits the generated temporary URL for additional information to the second device. Thereafter, in operation 617, the first device receives a request for additional information, which is made using the temporary URL, from the second device. In operation 619, the first device reads out the additional information corresponding to the temporary URL, and conveys the read additional information to the second device.

Figure 7:
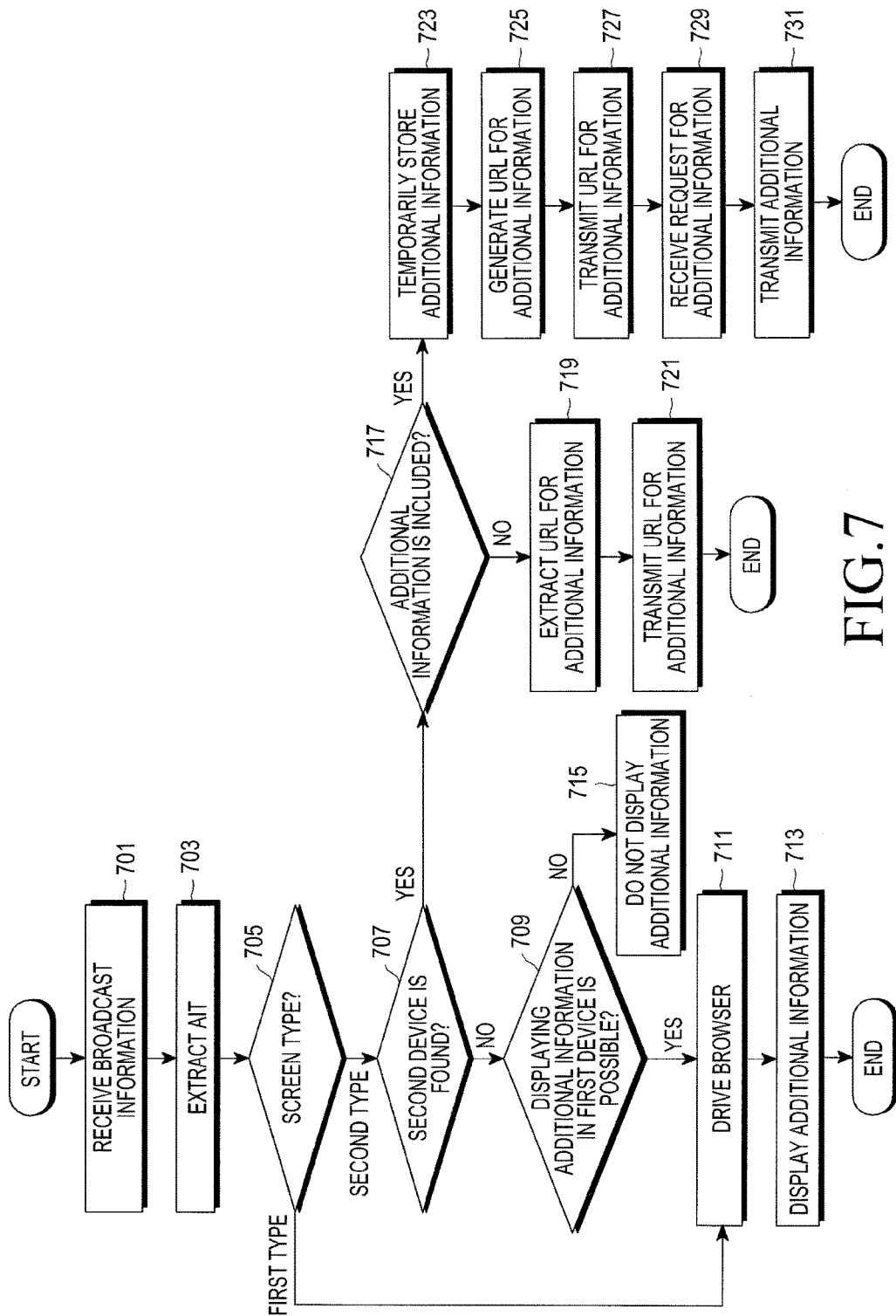
FIG. 7 is a flowchart illustrating an operation of providing additional information to a second device by a first device in a broadcast communication system according to an embodiment of the present disclosure.

FIG. 7 is a flowchart illustrating an operation of providing additional information to a second device by a first device in a broadcast communication system according to an embodiment of the present disclosure.

Referring to FIG. 7, in operation 701, the first device receives a broadcast stream over a broadcast channel. The broadcast stream includes a broadcast content and broadcast information. The broadcast information includes an AIT, and the first device extracts the AIT from the broadcast information in operation 703. In operation 705, the first device determines an attribute "Screen type" in the extracted AIT, and determines a device in which to execute an application, that is, a device where additional information will be displayed, based on the attribute "Screen type".

As an example, the attribute "Screen type" may be set to one of values "Main", "Sub_Alternative", and "Sub", and details of the respective values of "Screen type" are presented below in Table 3.

TABLE 3

| | |
|---|---|
| Main | This indicates a broadcast service application that may be executed in a first device. |
| Sub_Alternative | This indicates a broadcast service application that is executed in a second device, but may also be executed in the first device if there is no second device. |
| Sub | This indicates a broadcast service application that may be executed in a second device. |

If the attribute "Screen_type" has a value of "Main" corresponding to the first type, additional information is displayed only in the first device. Thereafter, the first device proceeds to operation 711, and drives a browser cap of displaying additional information. Subsequently, in operation 713, the first device displays additional information to a user.

If the attribute "Screen_type" has a value of "Sub_Alternative" or "Sub" corresponding to the second type, the first device proceeds to operation 707, and determines if a second device is found. If, as a result of the determination in operation 707, a second device is not found, then the first device proceeds to operation 709, and determines if additional information can be displayed in the first device. In the case of "Sub_Alternative", since it is possible to display additional information in the first device, the first device proceeds to operation 711, and displays additional information to a user. On the other hand, in the case of "Sub", since it is impossible to display additional information in the first device, the first device proceeds to operation 715, and does not display additional information.

If, as a result of the determination in operation 707, a second device is found, then the first device proceeds to operation 717, and determines if the AIT includes the actual additional information. If, as a result of the determination in operation 717, the AIT does not include additional information, then the first device proceeds to operation 719, and extracts a URL for additional information from the AIT. Thereafter, in operation 721, the first device transmits the extracted URL for additional information to the second device. Thereafter, the second device receives the URL for additional information, and drives a browser to display additional information, received over a broadband channel, to a user.

On the other hand, if, as a result of the determination in operation 717, the AIT includes additional information, then the first device proceeds to operation 723, and temporarily stores, for example, additional information composed of HTML. Further, in operation 725, the first device generates a temporary URL for additional information, by which the stored additional information can be provided. Thereafter, in operation 727, the first device transmits the generated temporary URL for additional information to the second device. Subsequently, upon receiving a request for additional information, which is made using the temporary URL, from the second device in operation 729, the first device transmits the additional information indicated by the temporary URL to the second device in operation 731. Thereafter, the second device receives the additional information indicated by the temporary URL from the first device, and drives a browser to display the received additional information to a user.

In the above embodiment of the present disclosure, the second device is to identify whether the URL for additional information, received from the first device, is a URL by which additional information can be received over a broadband channel or a temporary URL generated in the first device.

Figure 8:
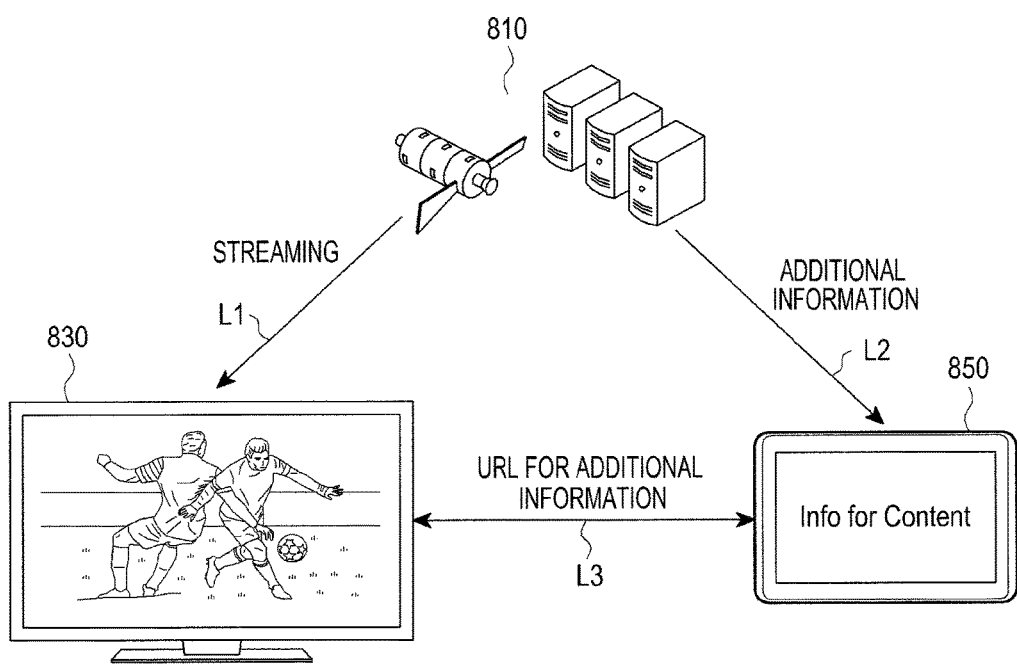
FIG. 8 illustrates an operation of providing additional information to devices by a broadcast service provider in a broadcast communication system according to an embodiment of the present disclosure.

FIG. 8 illustrates an operation of providing additional information to devices by a broadcast service provider in a broadcast communication system according to an embodiment of the present disclosure.

Referring to FIG. 8, a broadcast service provider 810 provides broadcast information and a broadcast content, for example, in the form of a streaming service, to a first device 830 over a broadcast channel L1. Further, an external server of the broadcast service provider 810 provides additional information to a second device 850 over a broadband channel L2.

Referring to FIG. 8, a situation is assumed in which a user watches a sports broadcast by using the first device 830 to receive broadcast information over the broadcast channel L1, and more particularly, the user is intended to be provided with additional information associated with the sport broadcast, for example, player information, game records, and the like, through the second device 850 while watching the corresponding sports broadcast.

The first device 830 conveys a URL for additional information associated with the corresponding sports broadcast to the second device 850 over a separate channel L3. Upon receiving the URL for additional information, the second device 850 receives additional information from the broadcast service provider 810 over the broadband channel L2. Subsequently, the second device 850 displays the received additional information to the user.

According to various embodiments of the present disclosure as described above, a first device may provide a URL for additional information or additional information itself, included in broadcast information, to a second device. Accordingly, the first device may display a broadcast content to a user, and the second device may display additional information associated with the broadcast content to the user.

Further, if broadcast information received over a broadcast channel includes the actual additional information, the second device may directly receive the additional information through the first device and display the received additional information to a user.

Further, if broadcast information received over a broadcast channel includes a URL for providing additional information and the actual additional information is provided over a broadband channel, the second device may receive the URL for additional information and receive additional information over the broadband channel by using the received URL.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting additional information by a first device in a broadcast communication system, the method comprising:
   extracting, by the first device, an application information table (AIT) from a broadcast information;
   acquiring, by the first device, from the AIT, screen type information and one of additional information related to the broadcast information and location information for the additional information;
   determining, by the first device, whether the first device is allowed to be displayed the additional information based on the screen type information;

displaying, by the first device, the additional information or the additional information acquired based on the location information, if the first device is allowed to display the additional information based on the screen type information; and transmitting, by the first device, to a second device, one of the additional information and the location information, if the first device is not allowed to display the additional information based on the screen type information.

2. The method of claim 1, wherein the screen type information includes one of first type information indicating that the additional information is allowed to be displayed on the first device, second type information indicating that the additional information is allowed to be displayed on the second device, and third type information indicating that the additional information is allowed to be displayed on the second device and the additional information is allowed to be displayed on the first device if there is no the second device.

3. The method of claim 1, wherein the transmitting of the additional information to the second device comprising:

temporarily, by the first device, storing the additional information, and generating temporary location information indicating a location where the additional information is temporarily stored;

transmitting, by the first device, the temporary location information to the second device;

receiving, by the first device, a request for the additional information based on the temporary location information from the second device; and transmitting, by the first device, the additional information to the second device in response to the request.

4. The method of claim 1, wherein the location information for the additional information comprises a uniform resource locator (URL) information that is used to receive the additional information from a server on a broadband channel.

5. The method of claim 1, wherein the broadcast information is received from a broadcast service provider over a broadcast channel.

6. A method for receiving additional information by a second device in a broadcast communication system, the method comprising:

receiving, by the second device, from a first device, one of additional information related to broadcast information and location information for the additional information based on screen type information; and displaying, by the second device, the additional information or the additional information acquired based on the location information, wherein the screen type information and one of the additional information and the location information are acquired from an application information table (AIT) extracted from the broadcast information, wherein one of the additional information and the location information is received if the first device is not allowed to display the additional information based on the screen type information, and wherein the additional information is displayed on the first device, if the first device is allowed to display the additional information based on the screen type information.

7. The method of claim 6, wherein the screen type information includes one of first type information indicating that the additional information is allowed to be displayed on the first device, second type information indicating that the additional information is allowed to be displayed on the second device, and third type information indicating that the additional information is allowed to be displayed on the second device and the additional information is allowed to be displayed on the first device if there is no the second device.

8. The method of claim 6, wherein the receiving of the additional information from the first device comprises:

receiving, by the second device, from the first device, temporary location information indicating a location where the additional information is temporarily stored in the first device;

transmitting, by the second device, to the first device, a request for the additional information based on the temporary location information; and receiving, by the second device, the additional information from the first device in response to the request.

9. The method of claim 6, wherein the location information for the additional information comprises a uniform resource locator (URL) information that is used to receive the additional information from a server on a broadband channel.

10. The method of claim 6, wherein the broadcast information is provided by a broadcast service provider over a broadcast channel.

11. A first device in a broadcast communication system, the first device comprising:

a display;

a processor configured to:
extract an application information table (AIT) from a broadcast information,
acquire, from the AIT, screen type information and one of additional information related to the broadcast information and location information for the additional information,
determine whether the first device is allowed to be displayed the additional information based on the screen type information, and
display the additional information or the additional information acquired based on the location information on the display, if the first device is allowed to display the additional information based on the screen type information; and a transceiver configured to transmit, to a second device, one of the additional information and the location information, if the first device is not allowed to display the additional information based on the screen type information.

12. The first device of claim 11, wherein the screen type information includes one of first type information indicating that the additional information is allowed to be displayed on the first device, second type information indicating that the additional information is allowed to be displayed on the second device, and third type information indicating that the additional information is allowed to be displayed on the second device and the additional information is allowed to be displayed on the first device if there is no the second device.

13. The first device of claim 11, further comprising:

a memory,
wherein the processor is further configured to:
temporarily store the additional information in the memory, and generate temporary location information indicating a location where the additional information is temporarily stored, and
control the transceiver to transmit the temporary location information to the second device, receive a request for the additional information based on the temporary location information from the second device, and transmit the additional information to the second device in response to the request.

14. The first device of claim 11, wherein the location information for the additional information comprises a uniform resource locator (URL) information that is used to receive the additional information from a server on a broadband channel.

15. The first device of claim 11, wherein the broadcast information is received from a broadcast service provider over a broadcast channel.

16. A second device in a broadcast communication system, the second device comprising:
  a display;
  a transceiver configured to receive, from a first device, one of additional information related to broadcast information and location information for the additional information based on screen type information; and
  a processor configured to display the additional information or the additional information acquired based on the location information on the display,
  wherein the screen type information and one of the additional information and the location information are acquired from an application information table (AIT) extracted from the broadcast information,
  wherein one of the additional information and the location information is received if the first device is not allowed to display the additional information based on the screen type information, and
  wherein the additional information is displayed on the first device, if the first device is allowed to display the additional information based on the screen type information.

17. The second device of claim 16, wherein the screen type information includes one of first type information indicating that the additional information is allowed to be displayed on the first device, second type information indicating that the additional information is allowed to be displayed on the second device, and third type information indicating that the additional information is allowed to be displayed on the second device and the additional information is allowed to be displayed on the first device if there is no the second device.

18. The second device of claim 16, wherein the processor is further configured to control the transceiver to:
  receive, from the first device, temporary location information indicating a location where the additional information is temporarily stored in the first device,
  transmit, to the first device, a request for the additional information based on the temporary location information, and
  receive the additional information from the first device in response to the request.

19. The second device of claim 16, wherein the location information for the additional information comprises a uniform resource locator (URL) information that is used to receive the additional information from a server on a broadband channel.

20. The second device of claim 16, wherein the broadcast information is provided by a broadcast service provider over a broadcast channel.

* * * * *